Aug. 20, 1929.  S. STÉPHANI  1,725,488
MASSAGE APPARATUS
Filed Oct. 8, 1927

WITNESSES

INVENTOR
Sophie Stephani

Patented Aug. 20, 1929.

1,725,488

UNITED STATES PATENT OFFICE.

SOPHIE STÉPHANI, OF ZURICH, SWITZERLAND.

MASSAGE APPARATUS.

Application filed October 8, 1927. Serial No. 224,951.

My invention relates to massage apparatus and has for its object the construction of a suction massage apparatus with interchangeable cups for different purposes.

Reference is to be had to the accompanying drawing, in which

Figure 1:
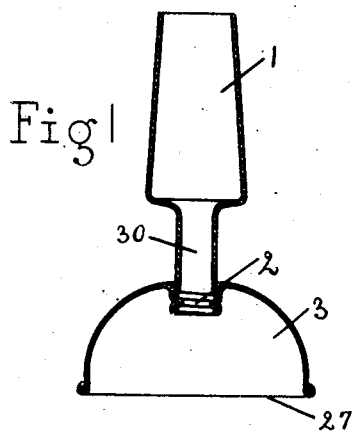
Fig. 1 shows a tube, connected to a vacuum source. A vacuum cup is screwed to the tube.

According to Figure 1 a tube 1 has a conical upper part and a smaller cylindrical part 30 with threads 2. A higher vacuum energy is attained by the reduced cylindrical part 30. A cup 3 is screwed to the tube 1. The latter is fitted with a rim 27. The cup 4 with the threads 6 and cup 5 with the threads 7 can be screwed also to the tube 1.

Figure 2:
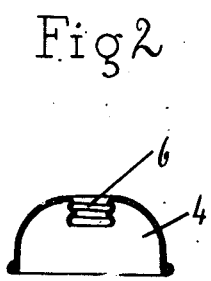
Figs. 2 and 3 show interchangeable cups, to be screwed to tube of Figure 1.
Figure 3:
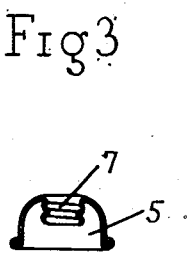

The apparatus in Figures 1 to 3 works in the following way:

In case fat or waste products should be removed from the chest or abdomen the cup 3 is fastened to the tube 1, which is connected to a vacuum cleaner by a flexible pipe. As the openings of the different vacuum sources differ somewhat the upper part of the tube 1 is made conical. The chamber of tube 1 acts as an auxiliary reservoir for the vacuum. This reservoir is necessary specially for the small cup 5. After having the apparatus started the rim 27 of the cup 3 set on the skin and the cup is shifted over the skin slowly. By this operation the lymphatic and blood circulation is increased and the fat, surrounding the muscles is removed after a certain time. By the vacuum of the cup 3 the skin is drawn partially into the cup and the blood circulation is increased. For the removing of the fat and waste products on the arms and legs the cup 4 should be used and for the massage of the face the cup 5 has to be applied. The latter strengthens the skin, removes wrinkles and fat parts. As it is necessary to stretch the skin of the face smoothly the smallest cup is used, as the same has the smallest area and therefore the smallest suction-energy. For the removing of waste parts on the chest and the abdomen a strong suction massage is necessary and therefore the largest cup is used. But at this operation the difficulty arises that the skin is drawn into the cup violently and the skin is stretched too much. Now it is desirable that the skin is extended only a little bit and therefore the distance holder 13 is fastened to the cup 11. The holder 13 carries the rim 14 and is equipped with the holes 12. The cylindrical part 31 of the tube 8 shows the holes 9 which can be regulated by the ring 10. The latter carries corresponding holes and by turning the ring 10 the holes 9 can be closed or more or less be opened.

Figure 4:
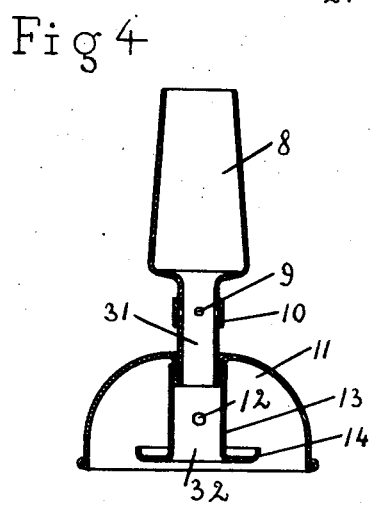
Fig. 4 shows a tube, a vacuum cup and a distance holder.
Figure 5:
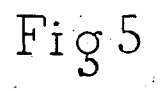
Figs. 5 and 6 show interchangeable pieces, to be fitted to the cup of Figure 4.

The apparatus according to Figure 4 works in the following way:

As the skin should not be drawn into the cup too much, the distance holder 13 is placed into the cup. As soon as the vacuum takes place the skin is drawn into the cup but only until the skin leans against the rim 14. A strong extension of the skin is avoided by the distance holder 13. If the skin closes the opening 32 the vacuum enters through the holes 12. The vacuum can be regulated by the closing of the holes 9 more or less. The distance holder 13 can be replaced by the tube 19 with the conical part 20. In case an infected wound should be treated the distance holder 13 is replaced by the tube 19, made from glass. The cup 11, made also from glass, and the tube 19 are set over the wound. At the beginning the blood can circulate freely but as soon as the skin leans against the part 20 of the tube 19 the blood-circulation is stopped. The physician has to decide if the wound has to be treated by a free or a stopped blood circulation.

Figure 6:
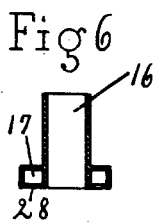

The figure 6 shows a distance holder 16 with a chamber 17 for medicine. The chamber 17 is fitted with the holes 28. At the treatment of the skin the medicine flows from the chamber 17 through the holes 28 on the skin and wets the latter.

Figure 7:
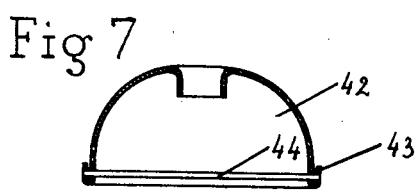
Fig. 7 shows a cup with a distance rod.

The Figure 7 shows a cup 42 with a rim 43 and a distance rod 44. The latter answers the same purpose as distance holder 13. The skin, drawn into the cup 42, leans against the rod 44.

The cups may be constructed also in the way, that the tube is fastened directly to the cup. The tube may be soldered to the cup.

In this case the cup can be fastened directly to the vacuum source.

I claim—

The combination of a vacuum massage cup, a tube comprising a conical part acting as an auxiliary reservoir and a reduced cylindrical part with means for detachable connection to the cup and an adjustable distance holder within the cup, providing a small chamber communicating with the tube and having a small hole to allow a passage for air from the cup to the tube.

In testimony whereof I affix my signature.

SOPHIE STÉPHANI.

CERTIFICATE OF CORRECTION.

Patent No. 1,725,488.                      Granted August 20, 1929, to

SOPHIE STEPHANI.

It is hereby certified that error appears in the printed specification of the above numbered patent requiring correction as follows: Page 2, after line 12, insert the following as claims 2, 3, and 4:

2. The combination of a vacuum massage cup, a tube comprising a conical part acting as an auxiliary reservoir and a reduced cylindrical part with means for detachable connection for the cup, and an adjustable distance holder within the cup, providing a small chamber communicating with the tube and having a small hole to allow a passage for air from the cup to the tube, and holes in the reduced cylindrical part.

3. The combination of a vacuum massage cup, a tube comprising a conical part acting as an auxiliary reservoir and a reduced cylindrical part with means for detachable connection for the cup, and an adjustable distance holder within the cup, providing a small chamber communicating with the tube and having a small hole to allow a passage for air from the cup to the tube and holes in the reduced cylindrical part and a slide for regulating the holes.

4. The combination of a vacuum massage cup, a tube comprising a conical part acting as an auxiliary reservoir and a reduced cylindrical part with means for detachable connection to the cup and an adjustable distance holder within the cup, providing a small chamber communicating with the tube and having a small hole to allow a passage for air from the cup to the tube, the distance holder fitted with a rim for rubbing the skin when the cup is shifted over the skin.;

and that the said Letters Patent should be read with this correction therein that the same may conform to the record of the case in the Patent Office.

Signed and sealed this 26th day of November, A. D. 1929.

M. J. Moore,
Acting Commissioner of Patents.

(Seal)